(12) United States Patent
Xu et al.

(10) Patent No.: US 11,161,155 B2
(45) Date of Patent: Nov. 2, 2021

(54) WHEEL FLANGE PLANE CLEANING DEVICE

(71) Applicant: CITIC Dicastal CO., LTD., Hebei (CN)

(72) Inventors: Zuo Xu, Qinhuangdao (CN); Xiao Liu, Qinhuangdao (CN); Jiandong Guo, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 426 days.

(21) Appl. No.: 16/223,377

(22) Filed: Dec. 18, 2018

(65) Prior Publication Data

US 2019/0321865 A1 Oct. 24, 2019

(30) Foreign Application Priority Data

Apr. 19, 2018 (CN) .......................... 201810351786.X

(51) Int. Cl.
| | |
|---|---|
| *B08B 1/04* | (2006.01) |
| *B08B 1/00* | (2006.01) |
| *B08B 1/02* | (2006.01) |
| *B23C 3/04* | (2006.01) |
| *B60B 3/04* | (2006.01) |
| *B08B 13/00* | (2006.01) |

(52) U.S. Cl.
CPC ................ *B08B 1/04* (2013.01); *B08B 1/002* (2013.01); *B08B 1/02* (2013.01); *B23C 3/04* (2013.01); *B60B 3/044* (2013.01); *B08B 13/00* (2013.01); *F16C 2326/02* (2013.01)

(58) Field of Classification Search
None
See application file for complete search history.

(56) References Cited

FOREIGN PATENT DOCUMENTS

| | | | |
|---|---|---|---|
| CN | 204247616 U | * 4/2015 | |
| CN | 204769748 U | * 11/2015 | |
| GB | 1419388 A | * 12/1975 | ............... B08B 1/02 |

* cited by examiner

*Primary Examiner* — Eric W Golightly
(74) *Attorney, Agent, or Firm* — Cooper Legal Group, LLC

(57) ABSTRACT

A wheel flange plane cleaning device, in which three second cylinders drive respective first pressure blocks to extend to contact the rim of a wheel, then stepped limit rings, second cylinders and first pressure blocks position and clamp the wheel in the centers of end face support plates, the output end of a fourth cylinder drives a lifting plate, a servo motor and a brush plate to extend to the positions where a brush is in firm contact with the flange plane of the wheel, the output end of the servo motor drives the brush and the brush plate to rotate at a certain speed, the servo motor stops rotating after a period of time, and the three second cylinders drive the respective first pressure blocks to contract to the positions where the wheel can be freely pulled up wherein the fourth cylinder is a hydraulic cylinder.

1 Claim, 4 Drawing Sheets

WHEEL FLANGE PLANE CLEANING DEVICE

CROSS-REFERENCE TO RELATED APPLICATIONS

The present application claims benefit of Chinese Patent Application No. 201810351786.X, filed on Apr. 19, 2018, the contents of which are hereby incorporated by reference in its entirety.

BACKGROUND

After the machining of a wheel, several layers of different types of base powder, colored paint and other attachments need to be sprayed. Considering the assembly requirements of the wheel, the wheel flange plane is not allowed to carry any base powder or colored paint, but the base powder or colored paint is inevitably attached to the wheel flange plane during spraying or transport. At present, the attachments on the wheel flange planes are usually manually removed by workers in large-scale wheel manufacturers, and such treatment is high in cost, unlikely to guarantee the consistency and low in treatment efficiency. If an automatic wheel flange plane cleaning device can be developed, the treatment quality and efficiency will be greatly improved.

SUMMARY

The present disclosure relates to the field of automobile engineering, specifically to a wheel flange plane cleaning device.

The objective of the present disclosure is to provide a wheel flange plane cleaning device for improving the quality and efficiency of removing attachments from a wheel flange plane.

A wheel flange plane cleaning device includes a base, a first flange support plate, a first support, a first cylinder, a first connecting column, a first outer cover, stepped limit rings, second cylinders, first pressure blocks, a brush, a brush plate, a servo motor, end face support plates, a second outer cover, a second connecting column, a third cylinder, a second flange support plate, a second support, a first guide rod, a first connecting block, first brackets, first guide pillars, sliding sleeves, a first hydraulic cylinder, a lifting plate, a first limit plate, a second limit plate, a limit screw, a third support, a second connecting block, a second guide rod, blowers and a suction fan.

The third support is mounted on the base, the first hydraulic cylinder is mounted on the third support, a stud at the output end of the first hydraulic cylinder is screwed into a threaded hole of the lifting plate, the four sliding sleeves are mounted on the lifting plate, the four first guide pillars penetrate through the four sliding sleeves and are mounted on the third support, the servo motor is mounted on the lifting plate, the first limit plate is mounted below the lifting plate, the first limit plate is provided with a threaded hole, the second limit plate is mounted on the third support and has a certain gap with the first limit plate, the four first brackets are uniformly arranged around the first hydraulic cylinder and mounted on the third support, the end face support plates are mounted on the four first brackets, the stepped limit rings are mounted on the end face support plates, the three second cylinders are arranged uniformly on the upper planes of the stepped limit rings, the first pressure blocks are mounted at the output ends of the second cylinders, a wheel is placed on the steps of the stepped limit rings at corresponding size positions, the first support and the second support are symmetrically mounted at the two ends of the third support, the first flange support plate and the second flange support plate are respectively mounted on the first support and the second support, the first cylinder is mounted on the first flange support plate and the first support, the third cylinder is mounted on the second flange support plate and the second support, the output end of the first cylinder is mounted to the first outer cover through the first connecting column, the output end of the third cylinder is mounted to the second outer cover through the second connecting column, the first connecting block and the second connecting block are symmetrically mounted at the two ends of the third support, the first guide rod is mounted on the first connecting block and connected to the output end of the third cylinder, and the second guide rod is mounted on the second connecting block and connected to the output end of the first cylinder; the blowers are mounted on the end face support plates, the outlets of the blowers are aligned with a brush area, and a suction opening of the suction fan penetrates through the second outer cover and is mounted on the base.

In actual production, one wheel model is usually produced in at least one shift, and the limit screw does not need to be replaced frequently, so that the production has certain continuity, the auxiliary time is reduced and the production efficiency is improved.

After the brush has brushed a certain number of wheels, the brush itself has stuck too much dust, so that the flange plane of the wheel cannot be cleaned. Therefore, each time the brush is operated, the first cylinder and the third cylinder drive the first outer cover and the second outer cover to extend to close the inner space, the air outlets of the blowers are aligned with the brush to blow air, the dust diffuses throughout the entire space, at the same time, the suction opening of the suction fan also starts to work to suck the internal dust away, thus ensuring that the brush is always in a clean state to clean the flange plane of the wheel.

The steps of the stepped limit rings limit the wheel in a small area so that the radial movement range of the wheel is limited, and the enlarged brush and the enlarged brush plate are used to fully cover the flange plane of the wheel so as to solve the error caused by misalignment of the center line of the wheel and the center line of the end face support plates.

The first guide rod and the second guide rod ensure the stability of the second outer cover and the first outer cover during the movement.

The first pressure blocks are made of polytetrafluoroethylene, which avoids pressing marks on the rim of the wheel to due to too hard materials for the pressure blocks; the first outer cover and the second outer cover are made of polytetrafluoroethylene, which avoids the problems that the too heavy cantilever portions of the outer covers are greatly deformed and the connection portions of the first outer cover and the second outer cover are not tight enough if too heavy materials are selected.

The stepped limit rings have a plurality of groups of steps, which can adapt to a plurality of wheels of different sizes; and the first limit plate and the second limit plate are provided with a plurality of corresponding threaded holes and through holes, which can adapt to a plurality of wheels of different sizes.

The cleaning device provided by the present disclosure greatly improves the cleaning effect on the flange plane of the wheel and the production efficiency of the workshop, and avoids the influence of human factors such as the operation level of workers in the workshop on the cleaning effect and the production efficiency.

BRIEF DESCRIPTION OF THE DRAWINGS

The embodiments of the present disclosure will be described in detail below in combination with the accompanying drawings.

Figure 1:
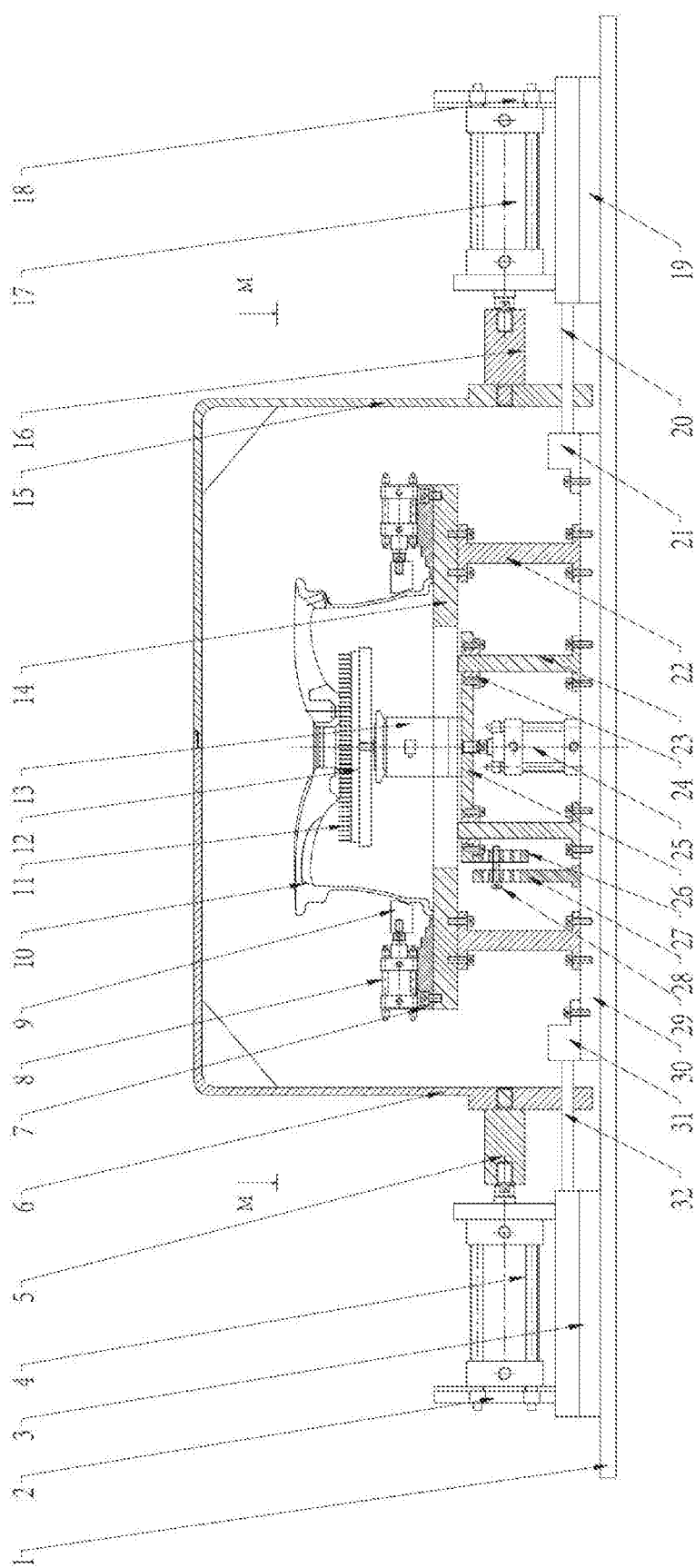
FIG. 1 is a front view of a wheel flange plane cleaning device according to the present disclosure.
Figure 2:
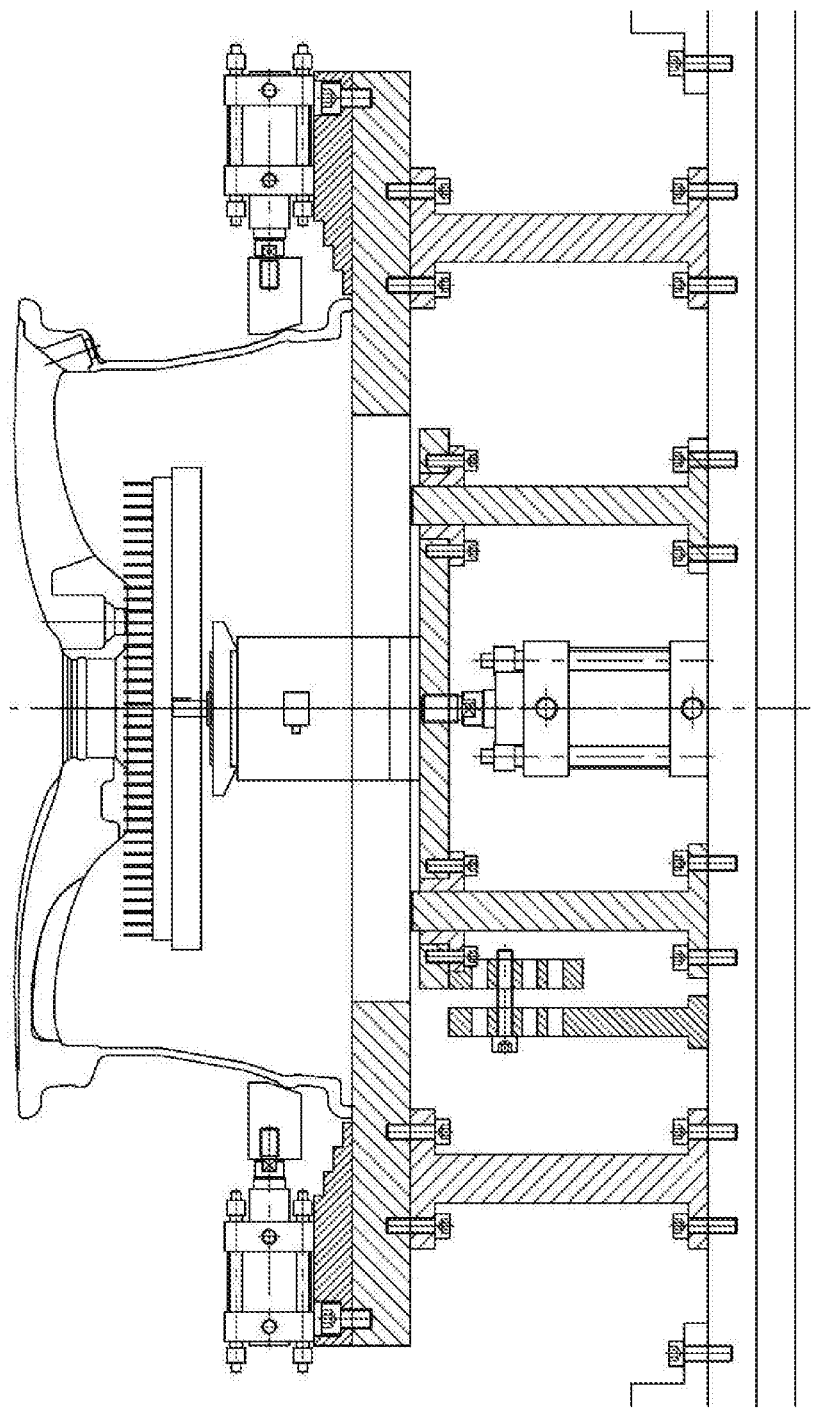
FIG. 2 is a partial enlarged view of the front view of the wheel flange plane cleaning device according to the present disclosure.
Figure 3:
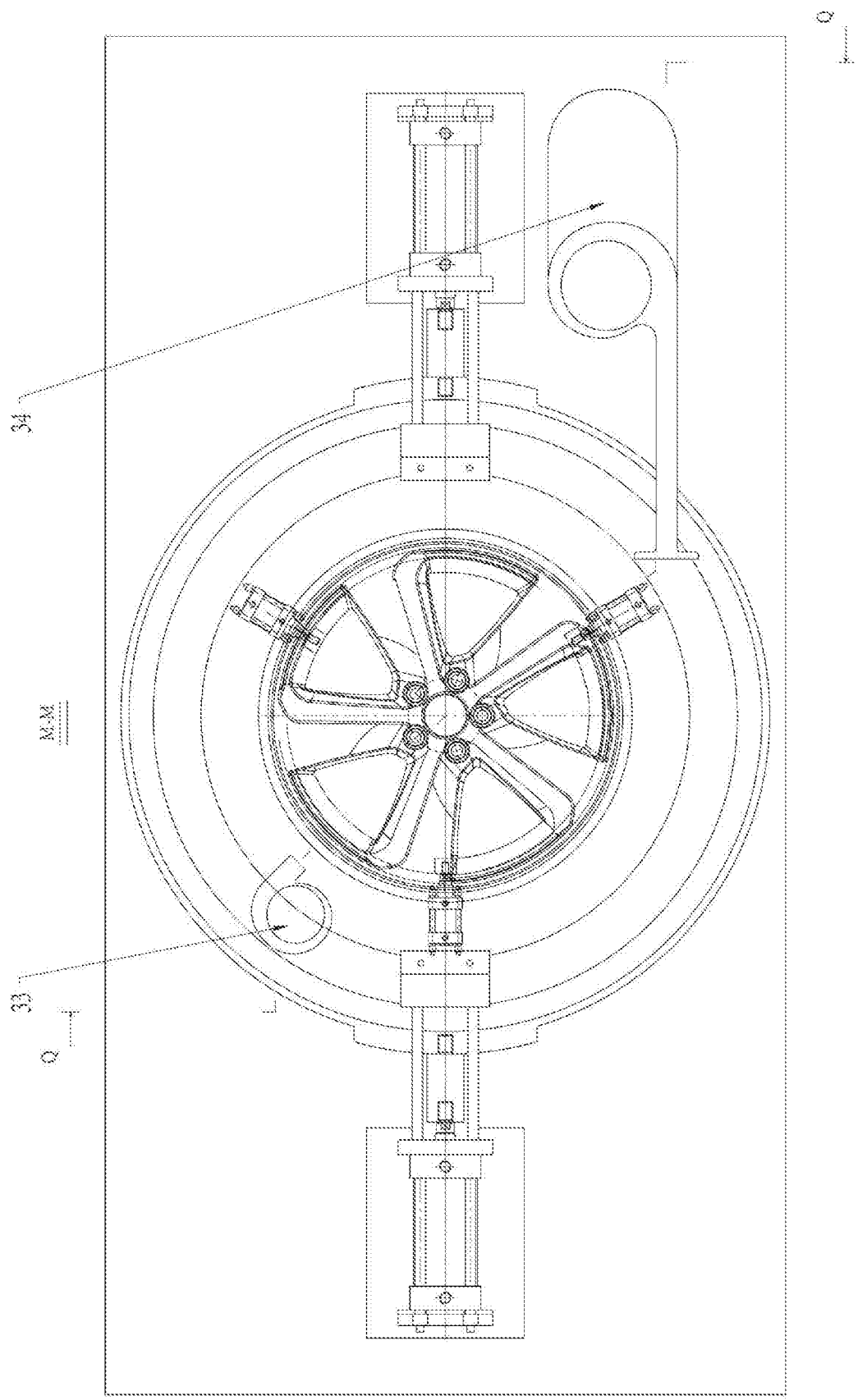
FIG. 3 is a top view of the wheel flange plane cleaning device according to the present disclosure.
Figure 4:
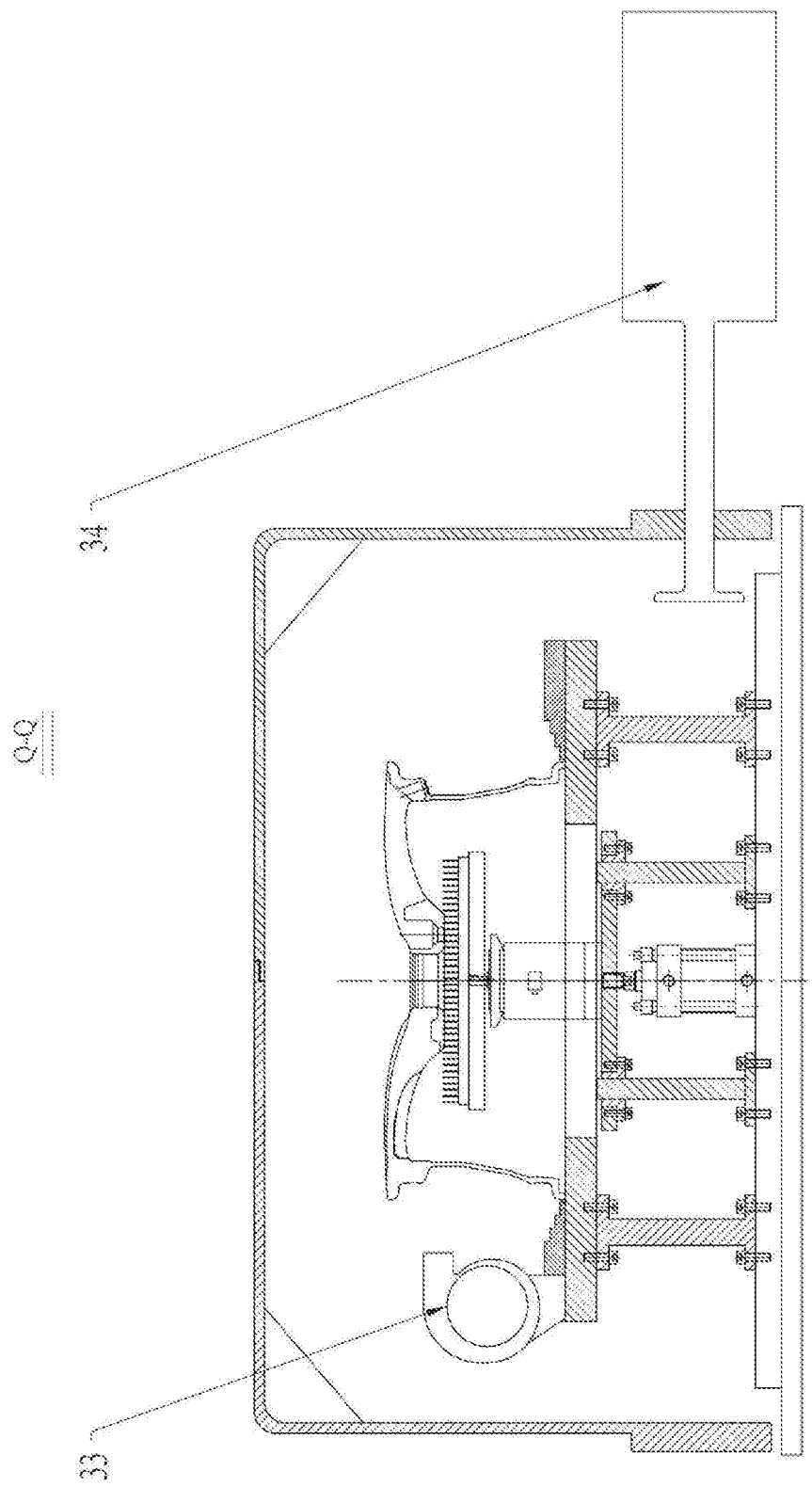
FIG. 4 is a partial sectional view of the wheel flange plane cleaning device according to the present disclosure.

LIST OF REFERENCE SYMBOLS 1 base
2 first flange support plate
3 first support
4 first cylinder
5 first connecting column
6 first outer cover
7 limit ring
8 second cylinder
9 first pressure block
10 wheel
11 brush
12 brush plate
13 servo motor
14 end face support plate
15 second outer cover
16 second connecting column
17 third cylinder
18 second flange support plate
19 second support
20 first guide rod
21 first connecting block
22 first bracket
23 first guide pillar
24 sliding sleeve
25 first hydraulic cylinder
26 lifting plate
27 first limit plate
28 second limit plate
29 limit screw
30 third support
31 second connecting block
32 second guide rod
33 blower
34 suction fan

DETAILED DESCRIPTION

A wheel flange plane cleaning device includes a base 1, a first flange support plate 2, a first support 3, a first cylinder 4, a first connecting column 5, a first outer cover 6, stepped limit rings 7, second cylinders 8, first pressure blocks 9, a brush 11, a brush plate 12, a servo motor 13, end face support plates 14, a second outer cover 15, a second connecting column 16, a third cylinder 17, a second flange support plate 18, a second support 19, a first guide rod 20, a first connecting block 21, first brackets 22, first guide pillars 23, sliding sleeves 24, a first hydraulic cylinder 25, a lifting plate 26, a first limit plate 27, a second limit plate 28, a limit screw 29, a third support 30, a second connecting block 31, a second guide rod 32, blowers 33 and a suction fan 34.

The third support 30 is mounted on the base 1, the first hydraulic cylinder 25 is mounted on the third support 30, a stud at the output end of the first hydraulic cylinder 25 is screwed into a threaded hole of the lifting plate 26, the four sliding sleeves 24 are mounted on the lifting plate 26, the four first guide pillars 23 penetrate through the four sliding sleeves 24 and are mounted on the third support 30, the servo motor 13 is mounted on the lifting plate 26, the first limit plate 27 is mounted below the lifting plate, the first limit plate 27 is provided with a threaded hole, the second limit plate 28 is mounted on the third support 30 and has a certain gap with the first limit plate 27, the four first brackets 22 are uniformly arranged around the first hydraulic cylinder 25 and mounted on the third support 30, the end face support plates 14 are mounted on the four first brackets 22, the stepped limit rings 7 are mounted on the end face support plates 14, the three second cylinders 8 are arranged uniformly on the upper planes of the stepped limit rings 7, the first pressure blocks 9 are mounted at the output ends of the second cylinders 8, a wheel 10 is placed on the steps of the stepped limit rings 7 at corresponding size positions, the first support 3 and the second support 19 are symmetrically mounted at the two ends of the third support 30, the first flange support plate 2 and the second flange support plate 18 are respectively mounted on the first support 3 and the second support 19, the first cylinder 4 is mounted on the first flange support plate 2 and the first support 3, the third cylinder 17 is mounted on the second flange support plate 18 and the second support 19, the output end of the first cylinder 4 is mounted to the first outer cover 6 through the first connecting column 5, the output end of the third cylinder 17 is mounted to the second outer cover 15 through the second connecting column 16, the first connecting block 21 and the second connecting block 31 are symmetrically mounted at the two ends of the third support 30, the first guide rod 20 is mounted on the first connecting block 21 and connected to the output end of the third cylinder 17, and the second guide rod 32 is mounted on the second connecting block 31 and connected to the output end of the first cylinder 4; the blowers 33 are mounted on the end face support plates 14, the outlets of the blowers 33 are aligned with a brush area, and a suction opening of the suction fan 34 penetrates through the second outer cover 15 and is mounted on the base 1.

In actual use, the wheel is conveyed to a work preparation area by a conveyor belt, the first cylinder 4 and the third cylinder 17 respectively drive the first outer cover 6 and the second outer cover 15 to contract to the positions where the inner brush and the clamping mechanism are fully expanded, a manipulator places the wheel in the corresponding steps of the stepped limit rings 7, the three second cylinders 8 drive the respective first pressure blocks 9 to extend to contact the rim of the wheel 10, then the stepped limit rings 7, the second cylinders 8 and the first pressure blocks 9 position and clamp the wheel 10 in the centers of the end face support plates 14, the output end of the first hydraulic cylinder 25 drives the lifting plate 26, the servo motor 13 and the brush plate 12 to extend to the positions where the brush 11 is in firm contact with the flange plane of the wheel 10, the limit screw 29 passes through the second limit plate 28 and is screwed into the threaded hole of the first limit plate 27, thus, the positioning of the upper and lower positions of the brush 11 is completed, the output end of the servo motor 13 drives the brush 11 and the brush plate 12 to rotate at a certain speed, the servo motor 13 stops rotating after a period of time, the three second cylinders 8 drive the respective first pressure blocks 9 to contract to the positions where the wheel 10 can be freely pulled up, the manipulator grips the wheel 10, and the wheel 10 is conveyed to the conveyor belt and transported to next procedure.

After the brush 11 has brushed a certain number of wheels 10, the brush 11 itself has stuck too much dust, so that the flange plane of the wheel 10 cannot be cleaned. Therefore, each time the brush 11 is operated, the first cylinder 4 and the third cylinder 17 drive the first outer cover 6 and the second outer cover 15 to extend to close the inner space, the air outlets of the blowers 33 are aligned with the brush 11 to blow air, the dust diffuses throughout the entire space, at the same time, the suction opening of the suction fan 34 also starts to work to suck the internal dust away, thus ensuring that the brush 11 is always in a clean state to clean the flange plane of the wheel 10.

The invention claimed is:

1. A wheel flange plane cleaning device, comprising a base, a first flange support plate, a first support, a first cylinder, a first connecting column, a first outer cover, stepped limit rings, second cylinders, first pressure blocks, a brush, a brush plate, a servo motor, end face support plates, a second outer cover, a second connecting column, a third cylinder, a second flange support plate, a second support, a first guide rod, a first connecting block, first brackets, first guide pillars, sliding sleeves, a fourth cylinder, a lifting plate, a first limit plate, a second limit plate, a limit screw, a third support, a second connecting block, a second guide rod, blowers and a suction fan, wherein the third support is mounted on the base, the fourth cylinder is mounted on the third support, a stud at an output end of the fourth cylinder is screwed into a threaded hole of the lifting plate, four sliding sleeves are mounted on the lifting plate, four first guide pillars penetrate through the four sliding sleeves and are mounted on the third support, the servo motor is mounted on the lifting plate, the first limit plate is mounted below the lifting plate, the first limit plate is provided with a threaded hole, the second limit plate is mounted on the third support and has a certain gap with the first limit plate, four first brackets are uniformly arranged around the fourth cylinder and mounted on the third support, the end face support plates are mounted on the four first brackets, the stepped limit rings are mounted on the end face support plates, three second cylinders are arranged uniformly on upper planes of the stepped limit rings, the first pressure blocks are mounted at output ends of the second cylinders, a wheel is placed on steps of the stepped limit rings at corresponding size positions, the first support and the second support are symmetrically mounted at two ends of the third support, the first flange support plate and the second flange support plate are respectively mounted on the first support and the second support, the first cylinder is mounted on the first flange support plate and the first support, the third cylinder is mounted on the second flange support plate and the second support, an output end of the first cylinder is mounted to the first outer cover through the first connecting column, an output end of the third cylinder is mounted to the second outer cover through the second connecting column, the first connecting block and the second connecting block are symmetrically mounted at two ends of the third support, the first guide rod is mounted on the first connecting block and connected to the output end of the third cylinder, and the second guide rod is mounted on the second connecting block and connected to the output end of the first cylinder; the blowers are mounted on the end face support plates, outlets of the blowers are aligned with a brush area, and a suction opening of the suction fan penetrates through the second outer cover and is mounted on the base wherein the fourth cylinder is a hydraulic cylinder.

\* \* \* \* \*